United States Patent
Leibfried

[15] 3,670,013
[45] June 13, 1972

[54] SYNTHESIS OF PARTIAL ESTERS OF CERTAIN POLY(NEOPENTYL POLYOLS) AND ALIPHATIC MONOCARBOXYLIC ACIDS

[72] Inventor: Raymond T. Leibfried, Newark, Del.
[73] Assignee: Hercules Incorporated, Wilmington, Del.
[22] Filed: Oct. 16, 1969
[21] Appl. No.: 867,087

[52] U.S. Cl..................260/488 J, 260/410.6, 260/486 R
[51] Int. Cl.........................................C07c 67/00
[58] Field of Search..............260/488 J, 410.6, 468 R, 499, 260/410.9, 486

[56] References Cited

UNITED STATES PATENTS 2,958,706  11/1960  Hurwitz et al. ..................260/488
2,975,152  3/1961  Hurwitz et al. ..................260/488

*Primary Examiner*—Lorraine A. Weinberger
*Assistant Examiner*—Vivian Garner
*Attorney*—George H. Hopkins

[57] ABSTRACT

Disclosed is a process for partially esterifying certain neopentyl polyol material with certain aliphatic monocarboxylic acid material, and for condensing the resulting partial esters. The partial esterification and condensation are carried out substantially simultaneously in a reaction zone in a temperature range in which (1) substantially all of the water formed in the esterification and condensation reactions evaporates from the reaction mixture as it is formed, and (2) aliphatic monocarboxylic acid material evaporates to blanket the reaction mixture with aliphatic monocarboxylic acid vapor with sufficient heat to minimize condensation and return of water vapor in the reaction zone above the reaction mixture to the reaction mixture.

6 Claims, No Drawings

SYNTHESIS OF PARTIAL ESTERS OF CERTAIN POLY(NEOPENTYL POLYOLS) AND ALIPHATIC MONOCARBOXYLIC ACIDS

This invention is in the chemical arts. It pertains to the branch of organic chemistry having to do with carboxylic acid esters of polyether polyols.

More particularly, this invention is concerned with the production of partial esters of poly(neopentyl polyols) from certain neopentyl polyols and certain aliphatic monocarboxylic acids. These partial esters are useful as intermediates in the syntheses of the corresponding poly(neopentyl polyols), and in the syntheses of the corresponding fully esterified poly(neopentyl polyols). The poly-(neopentyl polyols) are per se useful. For instance, one poly(neopentyl polyol), dipentaerythritol, is useful as a carbonific agent in intumescent paints. The completely esterified poly(neopentyl polyols) are per se useful. For instance, they are useful as plasticizers for synthetic resins such as polyvinyl chloride and the like, and as base stocks for synthetic lubricants.

A partial ester of a poly(neopentyl polyol) and an aliphatic monocarboxylic acid (or aliphatic monocarboxylic acids) is the compound that results when less than all the hydroxyl hydrogens of the poly(neopentyl polyol) have been substituted by the acyl moiety of the aliphatic monocarboxylic acid (or acyl moieties of the aliphatic monocarboxylic acids).

In one process for making a specific partial ester product a mixture of pentaerythritol, fatty acids, (1-3 moles of fatty acids per mole of pentaerythritol), an acid catalyst and a quantity of xylene sufficient to entrain water formed by the esterification and condensation (also called etherification, as well as dehydration) reactions is established in a temperature range in which the desired reactions are effected at practical optimum reaction rates, and in which xylene azeotropes water from the reaction mixture. The reaction mixture is maintained in this temperature range for the period of time needed to esterify the pentaerythritol to the desired extent and to condense the partially esterified pentaerythritol to the desired extent. This period of time is ascertained by reference to the quantity of water that is azeotroped from the reaction mixture by the xylene. When the quantity of water measured equals the theoretical quantity of water formed when the polyol has been esterified to the desired extent, plus the theoretical quantity of water formed when the partially esterified polyol has been condensed to the desired extent, the end of this period of time has been reached. Then, a stoichiometric excess of one or more carboxylic acids or anhydrides thereof are added to completely esterify the partial esters in the reaction mixture, or a stoichiometric excess of an alcohol such as methanol is added so as to convert by transesterification the partial esters of polypentaerythritols in the reaction mixture to a polypentaerythritol product. The resulting reaction mixture generally is treated to isolate the desired end product which usually is either a mixture of completely esterified polypentaerythritols or a mixture of completely solvolyzed polypentaerythritols, depending upon whether complete esterification or transesterification was carried out.

A disadvantage of the foregoing process resides in the use of xylene to remove water formed in the reaction mixture. Its presence represents expense in storage, handling and recovery. Moreover, when the reactions are completed, usually a substantial quantity of xylene remains in the reaction mixture, and it represents one more substance from which the desired end product usually must be separated.

This disadvantage of the foregoing process is avoided by the process of this invention.

In summary, the process of this invention comprises introducing certain neopentyl polyol material, certain aliphatic monocarboxylic acid material and catalyst material into a reaction zone, whereby a reaction mixture is formed, establishing said reaction mixture in a temperature range in which (1) partial esterification of said polyol material by said acid material and condensation of the partially esterified polyol material are effected, (2) substantially all of the water formed in said esterification and etherification evaporates from said reaction mixture as it is formed, and (3) aliphatic monocarboxylic acid material evaporates from said reaction mixture to blanket said reaction mixture with aliphatic monocarboxylic acid vapor with sufficient heat to minimize condensation and return to the reaction mixture of water vapor in the reaction zone above the reaction mixture.

The neopentyl polyol material of this invention is material that consists essentially of at least one neopentyl polyol represented by the structural formula:

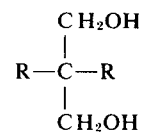

wherein each R is independently selected from the group consisting of $CH_3$, $C_2H_5$ and $CH_2OH$. Examples of such a neopentyl polyol include pentaerythritol, trimethylolpropane, trimethylolethane, neopentyl glycol and the like. In some embodiments of this invention the neopentyl glycol material comprises only one such neopentyl polyol. In other embodiments it comprises two or more such neopentyl polyols.

The aliphatic hydrocarbon monocarboxylic acid material of this invention consists essentially of at least one aliphatic monocarboxylic acid that vaporizes sufficiently in the specified temperature range when in the reaction mixture to blanket the reaction mixture with vapor, carry water vapor out of the reaction zone, and minimize condensation of water vapor in the reaction zone. In some embodiments of this invention it comprises only one such acid. In other embodiments of this invention it includes two or more such acids. Examples of such an acid include alkanoic acids like, for example, the $C_1-C_{18}$ alkanoic acids which include acetic acid, butyric acid, valeric acid, caproic acid, enanthic acid, octanoic acid, pelargonic acid, decanoic acid, lauric acid, and the like. Other examples include higher fatty acids and higher fatty acid mixtures such as obtained from natural sources as well as those obtained as by the ozonolysis of oleic and linoleic acids, oxonation of olefins, oxidation of olefins, and the like. Examples of such an acid also include branched acids and hindered acids such as Koch acids. Alkenoic acids are also included and examples of them include palmitoleic, ricinoleic, linoleic, and the like. Preferably, the acid or acids that make up the aliphatic monocarboxylic acid material is or are immiscible or at least substantially insoluble in water.

The initial concentration of aliphatic monocarboxylic acid material in the reaction mixture is such as to provide an initial mole ratio of carboxyl groups to hydroxyl groups in a range from about 0.25:1 to about 0.5:1. However, higher and lower mole ratios are within the broader concepts of this invention. In this regard, a mole ratio less than about 0.25:1 results in dark products with high levels of impurities, while a mole ratio greater than about 0.5:1 tends to favor the esterification reaction and block the condensation reaction.

In preferred embodiments of the process of this invention during the course of the esterification-condensation reactions aliphatic monocarboxylic acid material is added to the reaction mixture from time to time or preferably continuously to replace at least part and preferably substantially all of the aliphatic monocarboxylic acid material evaporated from the reaction mixture.

The catalyst material involved in the mixture of this invention consists essentially of at least one acid esterification catalyst. In some embodiments of this invention it comprises only one such catalyst. In other embodiments it comprises two or more such catalysts. Examples of an acid esterification catalyst include mineral acids, preferred ones of which comprise sulfuric acid, hydrochloric acid, and the like, acid salts such as, for example, sodium bisulfate, sodium bisulfite, and the like, sulfonic acids such as, for example, benzene sulfonic acid, toluene sulfonic acid, polystyrene sulfonic acid, methyl sulfonic acid, ethyl sulfonic acid, and the like, The quantity of catalyst material present in the reaction mixture is a catalytic quantity. This depends on the composition of the catalyst material and the reaction temperature range. Too much of strong acid material can cause excessive color in the end product, while too little catalyst material will not promote the condensation reaction in the reaction temperature range. Recommended when the reaction temperature range is from about 170° to about 200° C. is about 10 millimols of p-toluene sulfonic acid per mole of neopentyl polyol material or about 10 milliequivalents of sulfuric acid per mole of neopentyl polyol material.

The minimum temperature of the reaction temperature range in which the reaction mixture is established and maintained is the temperature at which the esterification and condensation reactions occur and water formed in the reaction mixture evaporates therefrom, preferably with boiling. The maximum temperature is generally less than the decomposition temperatures of the components of the reaction mixture, and preferably less than the boiling point in the reaction mixture of the neopentyl polyol. A preferred temperature range is 170°–200° C. For this reason preferred aliphatic monocarboxylic acids are valeric acid, caproic acid and heptanoic acid.

The ambient pressure employed in carrying out the reaction is generally atmospheric pressure. However, lower ambient pressures can be employed if desired. Higher ambient pressures can be employed if aliphatic monocarboxylic acid material can be evaporated from the reaction mixture at such pressures and water removed with aliphatic monocarboxylic acid vapor.

The reaction period of length of time in which partial esterification and condensation is carried out in the reaction mixture depends on the extent of partial esterification and the extent of condensation desired. Generally, when the quantity of water formed in the partial esterification and condensation reaction and removed according to the concepts of this invention from the reaction zone is equal to that quantity of water calculated on a theoretical basis to be produced for the desired extent of partial esterification and the desired extent of condensation, the reactions are terminated.

The partial esterification and condensation reactions are terminated by cooling the reaction mixture to 20°–25° C., by neutralizing the acid catalyst material, or by adding a stoichiometric excess of carboxylic acid material and completely esterifying the partial esters.

The partial esterification and condensation reactions are carried out in conventional equipment.

The best mode now contemplated for carrying out this invention is illustrated by the following example of a specific embodiment of the process of this invention. This invention is not limited to the specific embodiment. In this example, all percentages are by weight unless otherwise expressly indicated, all parts by weight are indicated by "w" and all parts by volume are designated by "v" with the parts by weight (w) and the parts by volume (v) being in the same relationship as the kilogram to the liter.

EXAMPLE

This example illustrates a preferred specific embodiment of the process of this invention for making a partially esterified polypentaerythritol product from valeric acid and pentaerythritol.

To a reactor equipped with a mechanical stirrer, thermometer, thermoregulator, Barrett moisture trap and a Friedrichs condenser are charged pentaerythritol (272 w) and valeric acid (217 v). Extra valeric acid (38 v) is added to the Barrett moisture trap to assure a constant level of valeric acid in the reaction mixture when reflux begins.

The mixture of pentaerythritol and valeric acid in the reactor is heated to a temperature of 171° C., at which temperature a trace of water (0.5 v) begins to collect in the Barrett moisture trap. Concentrated sulfuric acid (1.0 w) diluted with water (2 v) is added to the mixture. The resulting reaction mixture is heated to a temperature of 192° C. and maintained at this temperature until 50.5 v of water has collected in the Barrett moisture trap. This takes about 1.4 hours from the time the sulfuric acid is introduced into the reaction mixture.

Sodium hydroxide (0.8 w) is added to the reaction mixture to neutralize the catalyst. The resulting mixture is the desired partial ester product. It consists essentially of partial esters of polypentaerythritols and valeric acid.

Usually it is expedient to treat this product by conventional ways and means to obtain a completely solvolyzed polypentaerythritol product or to obtain a completely esterified polypentaerythritol product.

When the partial ester product is treated by conventional ways and means to obtain a completely solvolyzed or alcoholyzed product, a typical vapor phase chromatography analysis of such product is: pentaerythritol, dipentaerythritol, tirpentaerythritol and tetrapentaerythritol at weight ratios of 35:38:19:8.

When the partial ester product is treated by conventional ways and means to obtain a completely esterified polypentaerythritol product, the resulting product is useful, for example, as a base stock for synthetic lubricants.

In a similar manner other partial ester products are obtained from the other neopentyl polyols of this invention and the aliphatic monocarboxylic acids of this invention.

A feature of advantage of the process of this invention is the absence of a water entraining agent different from the reactants.

Other features, advantages, and specific embodiments of this invention will become readily apparent to those in the exercise of ordinary skill in the art after reading the foregoing disclosures. These specific embodiments are within the scope of this invention. Moreover, while a specific embodiment of this invention has been described in considerable detail, variations and modifications can be effected without departing from the spirit and scope as disclosed and claimed.

The language "consisting essentially of" as used in this specification excludes any unrecited substance at a concentration sufficient to substantially adversely affect the essential properties and characteristics of the composition of matter being defined, while permitting the presence of one or more unrecited substances at concentrations insufficient to substantially adversely affect said essential properties and characteristics.

What I claim and desire to protect by Letters Patent is:

1. In a process for making a partially esterified poly(neopentyl polyol) product, which comprises introducing neopentyl polyol material, aliphatic monocarboxylic acid material and a catalytic quantity of acid catalyst material into a reaction zone, whereby a reaction mixture is formed, said neopentyl polyol material consisting essentially of at least one neopentyl polyol represented by the structural formula:

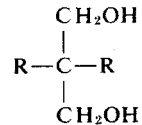

in which each R is independently selected from the group consisting of $CH_3$, $C_2H_5$ and $CH_2OH$, said aliphatic monocarboxylic acid material consisting essentially of at least one aliphatic hydrocarbon monocarboxylic acid, and said acid catalyst material consisting essentially of at least one acid esterification catalyst, the improvement wherein the initial concentration of said aliphatic monocarboxylic acid material in said reaction mixture is such as to provide an initial mole ratio of carboxyl groups to hydroxyl groups in the reaction mixture in a range from about 0.25:1 to about 0.5:1, and, while said reaction mixture is established and maintained at 170°–200° C., aliphatic monocarboxylic acid vapor and water vapor are withdrawn from said reaction zone.

2. A process according to claim 1, wherein said neopentyl polyol material consists essentially of pentaerythritol.

3. A process according to claim 2, wherein said aliphatic monocarboxylic acid material is selected from the group consisting of valeric acid, caproic acid and heptanoic acid.

4. A process according to claim 3, wherein said aliphatic monocarboxylic acid material is maintained in said reaction mixture at substantially said concentration.

5. A process according to claim 1, wherein aliphatic monocarboxylic acid material is added to said reaction mixture in said temperature range to replace at least part of the aliphatic monocarboxylic acid material evaporated from said reaction mixture.

6. A process according to claim 5, in which said aliphatic monocarboxylic acid material is insoluble in water, water vapor and aliphatic monocarboxylic acid vapor withdrawn from said reaction zone are collected and condensed, and aliphatic monocarboxylic acid material is separated from the condensate and returned to said reaction mixture:

* * * * *